(12) United States Patent  (10) Patent No.: US 8,116,550 B2
Zahniser  (45) Date of Patent: Feb. 14, 2012

(54) METHOD AND SYSTEM FOR LOCATING AND FOCUSING ON FIDUCIAL MARKS ON SPECIMEN SLIDES

(75) Inventor: Michael R. Zahniser, Cambridge, MA (US)

(73) Assignee: Cytyc Corporation, Marlborough, MA (US)

( * ) Notice: Subject to any disclaimer, the term of this patent is extended or adjusted under 35 U.S.C. 154(b) by 1095 days.

(21) Appl. No.: 11/957,236

(22) Filed: Dec. 14, 2007

(65) Prior Publication Data

US 2008/0152208 A1    Jun. 26, 2008

Related U.S. Application Data

(60) Provisional application No. 60/871,131, filed on Dec. 20, 2006.

(51) Int. Cl.
*G06K 9/00* (2006.01)
(52) U.S. Cl. ......... 382/133; 382/100; 382/128; 382/173
(58) Field of Classification Search .................. None
See application file for complete search history.

(56) References Cited

U.S. PATENT DOCUMENTS

| | | | | |
|---|---|---|---|---|
| 5,086,478 A | * | 2/1992 | Kelly-Mahaffey et al. | 382/151 |
| 5,149,976 A | * | 9/1992 | Sipma | 250/492.2 |
| 5,243,195 A | * | 9/1993 | Nishi | 250/548 |
| 5,245,676 A | * | 9/1993 | Spitz | 382/235 |
| 5,710,825 A | * | 1/1998 | Suda | 382/145 |
| 5,752,446 A | * | 5/1998 | Squibb | 101/486 |
| 5,771,306 A | * | 6/1998 | Stork et al. | 382/100 |
| 5,870,508 A | * | 2/1999 | Park | 382/289 |
| 5,875,258 A | * | 2/1999 | Ortyn et al. | 382/133 |
| 5,940,537 A | * | 8/1999 | Regen et al. | 382/210 |
| 6,069,932 A | * | 5/2000 | Peshkin et al. | 378/42 |
| RE36,730 E | * | 6/2000 | Nishi | 250/548 |

(Continued)

FOREIGN PATENT DOCUMENTS

WO    02080645    10/2002

OTHER PUBLICATIONS

PCT International Search Report for PCT/US2007/087652, Applicant Cytyc Corp., Forms PCT/ISA/210 and 220, dated Apr. 14, 2008 (5 pages).

(Continued)

*Primary Examiner* — Robert Kim
*Assistant Examiner* — Andrew Smyth
(74) *Attorney, Agent, or Firm* — Vista IP Law Group LLP

(57) ABSTRACT

Methods are disclosed for locating and focusing on a fiducial mark on a specimen slide. A plurality of pixels are identified as candidate pixels. A pixel is identified as a candidate pixel based on a number of empty pixels in an area defined by boundary lines extending from the pixel, and one or more dimensions, such as the perimeter, of the defined area. The candidate pixel enclosing the largest area is selected from the group or set of candidate pixels, and the coordinates of that pixel are considered to be the coordinates of the corner of the fiducial mark. The methods can be performed using different gray values that define dark or fiducial pixels and light or empty pixels. Differences between the results at different gray values can be used as focus scores for automatic focusing on the fiducial mark.

24 Claims, 20 Drawing Sheets

U.S. PATENT DOCUMENTS

| | | | |
|---|---|---|---|
| 6,198,794 B1 * | 3/2001 | Peshkin et al. | 378/42 |
| 6,278,483 B1 * | 8/2001 | Sartor | 348/96 |
| 6,323,776 B1 * | 11/2001 | Jackson et al. | 340/679 |
| 6,625,299 B1 * | 9/2003 | Meisner et al. | 382/103 |
| 6,751,352 B1 * | 6/2004 | Baharav et al. | 382/183 |
| 7,132,936 B1 * | 11/2006 | Norton | 340/440 |
| 2002/0186884 A1 * | 12/2002 | Shaked et al. | 382/183 |
| 2003/0179445 A1 * | 9/2003 | Maenle et al. | 359/368 |
| 2004/0028258 A1 * | 2/2004 | Naimark et al. | 382/103 |
| 2004/0109599 A1 * | 6/2004 | Cho et al. | 382/145 |
| 2005/0123181 A1 * | 6/2005 | Freund et al. | 382/128 |
| 2006/0077538 A1 * | 4/2006 | Zahniser et al. | 359/368 |
| 2006/0077541 A1 * | 4/2006 | Zahniser et al. | 359/396 |
| 2007/0036402 A1 * | 2/2007 | Cahill et al. | 382/128 |
| 2008/0013126 A1 * | 1/2008 | Tseng et al. | 358/3.01 |
| 2009/0299545 A1 * | 12/2009 | Quan et al. | 700/302 |

OTHER PUBLICATIONS

PCT Written Opinion of the International Search Authority for PCT/US2007/087652, Applicant Cytyc Corp., Form/PCT/ISA/237, dated Apr. 14, 2008 (7 pages).

* cited by examiner

FIG. 19

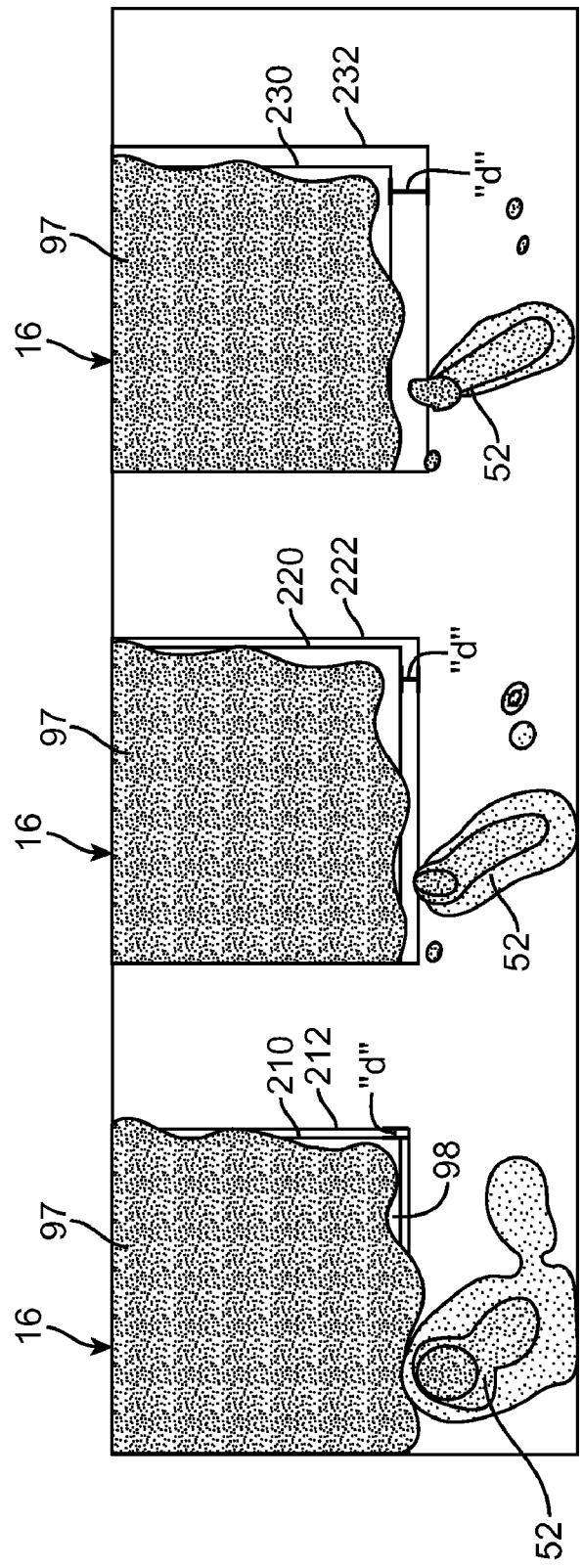

METHOD AND SYSTEM FOR LOCATING AND FOCUSING ON FIDUCIAL MARKS ON SPECIMEN SLIDES

RELATED APPLICATION DATA

The present application claims the benefit under 35 U.S.C. §119 to U.S. provisional patent application Ser. No. 60/871,131, filed Dec. 20, 2006. The foregoing application is hereby incorporated by reference into the present application in its entirety.

GOVERNMENT RIGHTS

This invention was made with U.S. Government support under NIH Grant No. RR018046. The U.S. Government may have certain rights in this invention.

FIELD OF THE INVENTION

The invention relates to imaging and analysis of biological specimens, and more particularly, to locating and focusing on fiducial marks on specimen slides.

BACKGROUND

Medical professionals and cytotechnologists often prepare biological specimens on a specimen carrier, such as a slide, and review specimens to analyze whether a patient has or may have a particular medical condition or disease. For example, it is known to examine a cytological specimen in order to detect malignant or pre-malignant cells as part of a Papanicolaou (Pap) smear test and other cancer detection tests. To facilitate this review process, automated systems focus the technician's attention on the most pertinent cells or groups of cells, while discarding less relevant cells from further review. One known automated imaging system that has been effectively used in the past is the ThinPrep Imaging System, available from Cytyc Corporation, 250 Campus Drive, Marlborough, Mass. 01752.

FIG. 1 generally illustrates one known biological screening system 10 that is configured for presenting a biological specimen 12 located on a microscope slide 14 (as shown in FIG. 2) to a technician, such as a cytotechnologist, who can then review objects of interest (OOIs) located in the biological specimen 12. The OOIs are arranged in a number of fields of interest (FOIs) that cover portions of the slide 14, so that the cytotechnologist's attention can be subsequently focused on OOIs within the FOIs, rather than slide regions that are not pertinent. The system 10 can be used for the presentation of cytological cervical or vaginal cellular material, such as that typically found on a Pap smear slide. In this case, the OOIs take the form of individual cells and cell clusters that are reviewed to check for the possible presence of an abnormal condition, such as malignancy or pre-malignancy.

The biological specimen 12 will typically be placed on the slide 14 as a thin cytological layer. A cover slip (not shown in FIG. 1) is preferably adhered to the specimen 12 to fix the specimen 12 in position on the slide 14. The specimen 12 may be stained with any suitable stain, such as a Papanicolaou stain.

An imaging station 18 is configured to image the slide 14, which is typically contained within a cassette (not shown in FIG. 1) along with other slides. During the imaging process, slides are removed from the respective cassettes, imaged, and returned to the cassettes in a serial fashion.

One known imaging station 18 includes a camera 24, a microscope 26, and a motorized stage 28. The camera 24 captures magnified images of the slide 14 through the microscope 26. The camera 24 may be any one of a variety of conventional cameras, such as cameras that can produce a digital output of sufficient resolution to allow processing of the captured images. A suitable resolution may be 640×480 pixels. Each pixel can be converted into an eight-bit value (0 to 255) depending on its optical transmittance. A value of "00000000" or "0" is the assigned value for least amount of light passing through the pixel, and a value of "11111111" or "255" is the assigned value for a greatest amount of light passing through the pixel. Thus, a "0" value indicates a dark value, e.g., a pixel of a fiducial mark, and a "255" value indicates a light value, e.g., an empty pixel.

The slide 14 is mounted on the motorized stage 28, which scans the slide 14 relative to the viewing region of the microscope 26, while the camera 24 captures images over various regions of the biological specimen 12. The motorized stage 28 tracks the x-y coordinates of the images as they are captured by the camera 24. Encoders (not shown) can be coupled to the respective motors of the motorized stage 28 in order to track the net distance traveled in the x- and y-directions during imaging.

Referring to FIG. 2, x-y coordinates tracked by the stage 28 are measured relative to fiducial marks 16 affixed to the slide 14. A fiducial mark 16 may be a rectangular patch of paint; in this case, one corner of the mark may be considered to be the marks's location. These fiducial marks 16 are also used by the reviewing station 22 to ensure that the x-y coordinates of the slide 14 during the review process can be correlated to the x-y coordinates of the slide 14 obtained during the imaging process.

More particularly, each reviewing station 20 includes a microscope 38 and a motorized stage 40. The slide 14 (after image processing) is mounted on the motorized stage 40, which moves the slide 14 relative to the viewing region of the microscope 38 based on the routing plan and a transformation of the x-y coordinates of the FOIs obtained from memory 36. These x-y coordinates, which were acquired relative to the x-y coordinate system of the imaging station 18, are transformed into the x-y coordinate system of the reviewing station 20 using the fiducial marks 16 affixed to the slide 14 (shown in FIG. 1). In this manner, the x-y coordinates of the slide 14 during the reviewing process are correlated to the x-y coordinates of the slide 14 during the imaging process. The motorized stage 40 then moves according to the transformed x-y coordinates of the FOIs, as dictated by the routing plan.

While known fiducial marks and coordinate systems used during imaging and review processes have been used effectively in the past, they can be improved. In particular, it can be difficult to locate fiducial marks in the presence of air bubbles and to focus on fiducial marks in the presence of dust and debris, as shown with reference to FIGS. 3-8.

FIG. 3 is a top view of a specimen slide 14 having three fiducial marks 16. A cover slip 50 is placed over the specimen 12. FIG. 4 is a top view of the slide 14 shown in FIG. 3 having dust or debris (generally dust 52) on the cover slip 50. FIG. 4 also illustrates an air bubble 54 underneath the cover slip 50. FIG. 5 is a side view of FIG. 4, which further illustrates dust 52 on top of the cover slip 50 and an air bubble 54 between the top of the slide 14 and the bottom of the cover slip 50.

Persons skilled in the art will appreciate that the dimensions shown in FIGS. 2-5 and other figures may not reflect actual dimensions and may not be to relative scale and are provided for purposes of illustration.

Referring to FIG. 6, when a cover slip 50 is placed on a slide, one or more air bubbles 54 may be trapped in the mounting medium 60 between the cover slip 50 and the slide 14. The fiducial mark 16 may appear to be a different shape and its true outline may be difficult to locate when an air bubble 54 or cellular debris overlaps the fiducial mark 16.

In addition, assuming a fiducial mark 16 is located, dust and debris 52 on top of the cover slip 50 may cause focusing errors. Automatic focusing on a specimen is generally done by focusing up and down until the objects in the image are in focus. Referring to FIG. 7, dust 52 or other debris (such as a fingerprint) on top of the cover slip 50 may cause an automatic focusing system or algorithm to focus on the dust 52, thereby resulting in a false plane 72, rather than locating the correct focal plane 70 corresponding to the sample 12 on the slide (which is coplanar with the fiducial marks 16).

The dotted line 80 in FIG. 8 shows focus or sharpness values for a set of images taken of a single microscope field at different focal heights. The field contains a fiducial mark 16 and also contains dust 52. The "x" axis represents a vertical distance (in microns) from the first or true focus plane 70. The second, false focus plane 72 is about 110 microns higher than the first focus plane 70; the false plane corresponds to the dust 52, which rests on top of the cover slip 50, which is about 100 microns thick. The "y" axis represents the logarithm of the Brenner score of the image. The Brenner score is a known method of quantifying image sharpness, and is the sum of the squares of the differences between the gray value of each pixel and its neighbor two pixels to the left, where differences less than a certain threshold are excluded from the sum to reduce the effect of image noise. A higher "y" axis value indicates that the image is in better focus and is sharper or clearer compared to lower "y" axis values. In the illustrated example, an automatic focusing system or algorithm that seeks to maximize the Brenner score would select the false focal plane 72, because its score is higher than the true focal plane 70.

Consequently, an imaging microscope 26 may focus on the dust 52 in the false focal plane 72 rather than on the fiducial mark 16 at the true focal plane 70. If the imaging station 18 scans this false focal plane 72 for cells instead of the true focal plane 70, many images taken of the sample 12 will be out of focus and objects of interest will be missed by the imaging software.

Thus, it would be desirable to have methods and systems that can more effectively locate fiducial marks on a specimen slide in the presence of air bubbles or other debris under the cover slip and that can focus on located fiducial marks in the presence of dust and debris on top of the cover slip.

SUMMARY OF THE INVENTION

In one embodiment, a method of locating a corner of a fiducial mark within an image of a specimen slide is provided, the image having a plurality of pixels, the method including selecting a pixel of the plurality of image pixels, the selected pixel defining an area based on lines extending from the selected pixel, the selected pixel being selected based on a ratio of a number of empty pixels in the defined area and one or more dimensions of the defined area satisfying a threshold, the method further including determining a location of the corner of the fiducial mark using the selected pixel. By way of one non-limiting example, the selected pixel may define the largest area compared to other image pixels that satisfy the threshold. By way of another non-limiting example(s), the boundary lines may be straight, and may extend from the selected pixel to an edge of the image, and an area defined by each pixel is a square or a rectangle. By way of a further, non-limiting example, the ratio can be a ratio of (number of empty pixels in the area defined by the selected pixel) to (one or more dimensions of the area defined by the selected pixel).

In another embodiment, a method of locating a corner of a fiducial mark within an image of a specimen slide is provided, the image having a plurality of pixels, the method including identifying a plurality of pixels as candidate pixels, each candidate pixel being identified based on a number of empty pixels in a bounding area defined by lines extending from the candidate pixel relative to one or more dimensions of the defined area; selecting one candidate pixel, wherein lines extending from the selected pixel define the largest bounding area compared to lines extending from other candidate pixels; and determining a location of the corner of the fiducial mark based on the selected candidate pixel. By way of non-limiting example, the bounding area corresponding to the selected pixel may contain the largest number of dark pixels compared to bounding areas defined by other candidate pixels. Again, by way of further non-limiting examples, the lines may be straight, may extend from the selected candidate pixel to an edge of the image, and the bounding area may be defined by each candidate pixel is a box or a rectangle.

The each candidate pixel may be identified based on a ratio satisfying a threshold, the ratio comprising a ratio of a number of empty pixels in the bounding area defined by lines extending from the selected candidate pixel to one or more dimensions of the bounding area. For example, each candidate pixel may be selected based on a ratio of the number of empty pixels in the bounding area to one or more dimensions of the bounding area being below a threshold, and the ratio may be a ratio of the number of empty pixels in the bounding area to the perimeter of the bounding area, e.g., a ratio of the number of empty pixels in the bounding area to the semiperimeter of the bounding area.

The method may optionally be performed in the presence of an air bubble or debris overlapping the fiducial mark, wherein a pixel may be treated as an empty pixel if a gray value of the pixel is greater than 128. Also, the method may optionally be performed at multiple gray value thresholds, and may further include calculating a focus score based on a difference between a first bounding area and a second bounding area, e.g., wherein the difference is the Euclidean distance between corners of the first and second bounding areas.

The method may optionally be performed at multiple gray value thresholds, wherein a first bounding area is identified using a first empty pixel threshold to identify a first location of the corner of the fiducial mark, and a second bounding area is identified using a second empty pixel threshold to identify a second location of the corner of the fiducial mark. The method may optionally further include calculating a focus score based on a distance between the first and second bounding areas, and automatically focusing an image device based on the calculated focus score, e.g., wherein the distance is the Euclidean distance between the corners of the first and second bounding areas.

BRIEF DESCRIPTION OF THE DRAWINGS

Referring now to the drawings in which like reference numbers represent corresponding parts throughout and in which:

FIG. 19 further illustrates a method of determining a number of empty pixels relative to a given pixel and generating of an empty pixel map according to one embodiment;

FIG. 21 illustrates boundary lines extending from a point and defining different bounding areas as a result of different dark/light threshold values relative to a fiducial mark that is in focus;

FIG. 22 illustrates boundary lines extending from a point and defining different bounding areas as a result of different dark/light threshold values relative to a fiducial mark that is less in focus compared to FIG. 21;

FIG. 23 illustrates boundary lines extending from a point and defining different bounding areas as a result of different dark/light threshold values relative to a fiducial mark that is less in focus compared to FIGS. 21 and 22.

DETAILED DESCRIPTION OF ILLUSTRATED EMBODIMENTS

Embodiments advantageously locate and focus on fiducial marks in the presence of air bubbles, dust and debris. Embodiments achieve these advantages by fitting a shape, such as a square, a rectangle a box or another shape (generally "bounding box" or "bounding area" or "area"), to an image of the corner of a fiducial mark. Embodiments can be implemented using bounding areas of various shapes. According to one embodiment, a boundary area is defined by two straight lines. The lines can be at various angles. Accordingly, references to a boundary area or box or rectangle are examples of some of the boundary area shapes that can be utilized.

The boundaries of the bounding box maximize the area of the bounding box while constraining the number of non-mark or empty pixels within the bounding box. A pixel of one image can be defined as a "dark," fiducial mark pixel or a "light," empty pixel based on a gray value cutoff. Focus settings or adjustments can be determined by comparing the bounding areas found using different gray value cutoffs.

Figure 9:
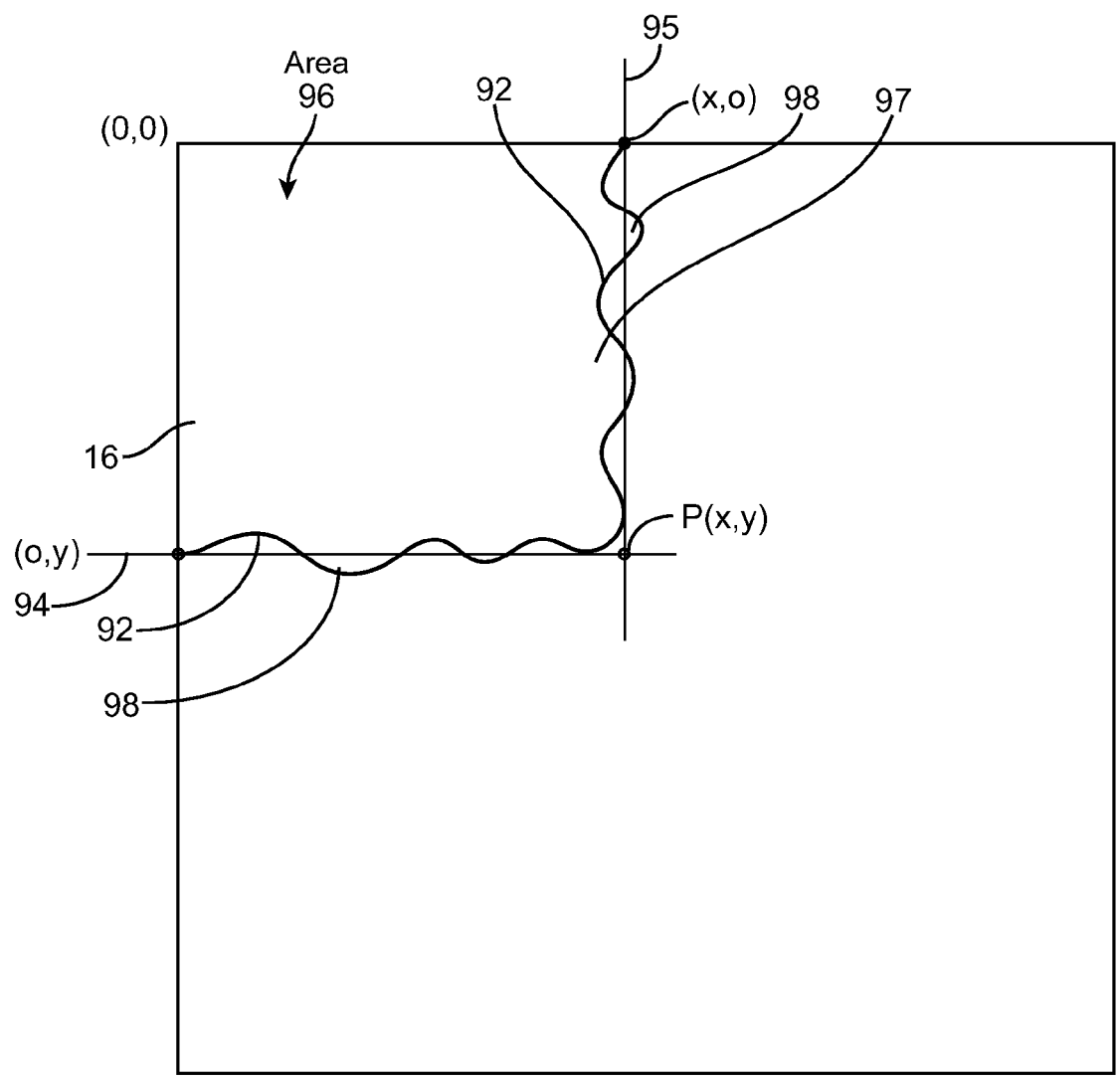
FIG. 9 generally illustrates a corner of a fiducial mark having an edge aligned with an x–y coordinate system and dark and empty pixels enclosed within an area defined by boundary lines extending from a point.

FIG. 9 illustrates an image of a corner of a fiducial mark 16 that extends beyond the top left corner of an image. The top left corner of the image can be specified as a (0, 0) location, and the bottom right corner of the fiducial mark 16 can be specified as a (x, y) location. Pixels above and to the left of the (x, y) location can be considered to be part of the fiducial mark 16. Persons skilled in the art will appreciate that other coordinate assignments can be utilized if different portions of the fiducial mark 16 are visible. Thus, FIG. 9 illustrates one example in which a bottom right corner of the fiducial mark 16 is visible and the coordinate system is based on the bottom right corner of the fiducial mark 16.

In the illustrated example, a horizontal boundary line 94 and a vertical boundary line 95 extend from a point or pixel P to define a bounding box 96. This specification refers to a bounding box being defined by a point or pixel in the sense that lines 94 and 95 extending from the point or pixel define a bounding box 96, as well as a bounding box 96 being defined by boundary lines 94 and 95 themselves. In the illustrated embodiment, the boundary lines 94 and 95 are straight and have "x" and "y" dimensions and a perimeter of 2*(x+y). In the illustrated example, the "x" and "y" dimensions are the same, but in other images, they may be different.

Due to imprecision in the process of depositing fiducial marks 16 on a slide, edges 92 of the fiducial mark 16 have irregularities on a microscopic scale. For example, as shown in FIG. 9, the edges 92 of a fiducial mark 16 may have non-linear or wave-like shapes. As a result of the irregular edge shape, the bounding box 96 may contain some empty pixels 98; exclude some fiducial mark pixels 97, or both. Dark pixels 97 may be pixels of the fiducial mark 16, and light pixels 98 may be empty pixels. For example, light pixels 98 may be empty pixels that are beyond the edge 92 of the fiducial mark 16 or pixels that represent gaps in the paint of the fiducial mark 16. For purposes of locating a fiducial mark 16, a bounding box 96 containing no empty pixels 97 will be too small; a bounding box 96 containing every fiducial mark pixel 97 will be too big. Therefore, the bounding box 96 should be allowed to contain some empty pixels 98, but not too many empty pixels 98.

Figure 10A:
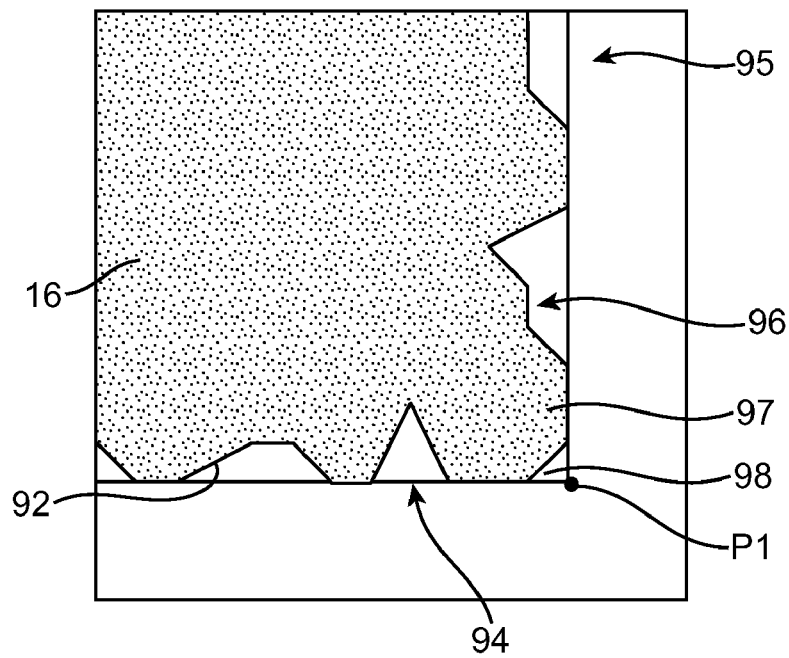
FIGS. 10A-B illustrate that the number of empty pixels contained within a bounding area is proportional to the perimeter of that rectangle.
Figure 10B:
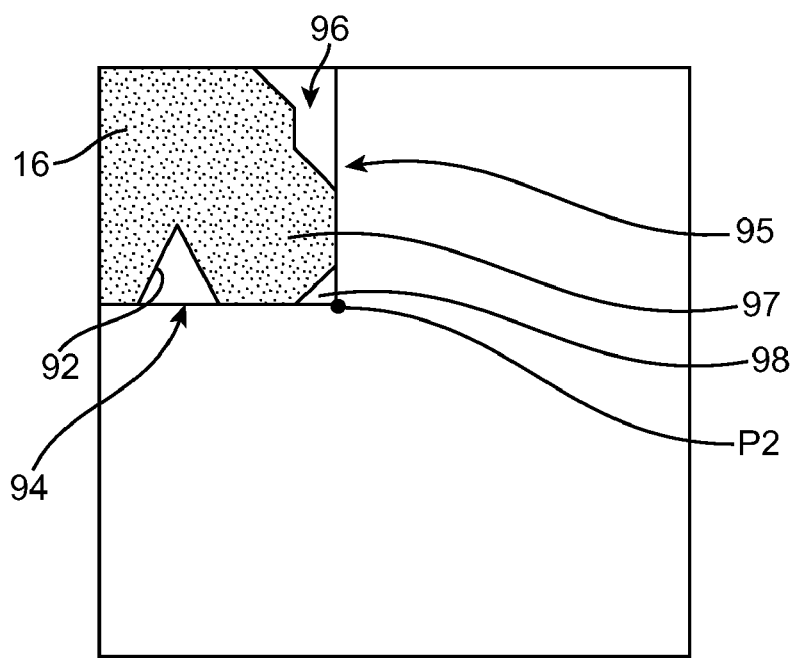

FIGS. 10A and 10B illustrate how two images taken of the same fiducial mark 16 at different slide locations may appear. Point P1 in FIG. 10A and Point P2 in FIG. 10B have been chosen in the two images at the same location relative to the mark 16. Points P1 and P2 define respective bounding rectangles 96 by respective boundary lines 94 and 95 extending from respective points P1 and P2 to the edges of the images.

As shown in the figures, the empty pixels 98 are indentations in the mark 16 extending from an edge 92 of the fiducial mark 16 to different depths into the fiducial mark 16. Assuming that the depth of the indentation of empty pixels 98 is a random function with a certain mean and variance, the expected number of empty pixels 98 for the best fit bounding box 96 is equal to that mean depth times the length of the edge 92 that is visible within the image.

In the illustrated example, the length of the edge (i.e., the sum of the "x" and "y" dimensions) of the bounding box 96 in FIG. 10A is about twice as long as the length of the edge (i.e., the sum of the "x" and "y" dimensions) of the bounding box 96 in FIG. 10B. The bounding box 96 in FIG. 10A contains twice as many empty pixels 98 compared to the box in FIG. 10B. This illustrates that the number of empty pixels 98 within a given bounding box 96 is proportional to the length of the edge (i.e., the sum of the "x" and "y" dimensions) of the bounding box 96.

FIGS. 11A-D further illustrate this proportionality. The indentations of empty pixels 98 in the fiducial mark edge 92 may be larger in some portions of the edge 92 than in others. However, indentions or pixels 98 have a certain average depth. Empty pixels or areas 98 within the bounding box 96 can be rearranged by distributing the empty areas 98 along a perimeter of the box 96 until empty areas 98 are evenly distributed at this average depth.

Figure 11B:
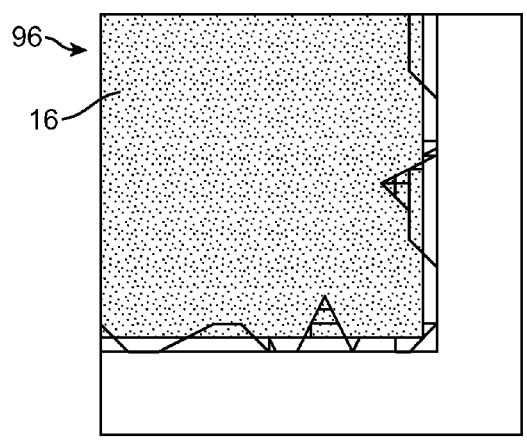
FIGS. 11A-D further illustrate the proportionality shown in FIG. 10 based on empty pixels being distributed along an even depth along an edge of the area.
Figure 11A:
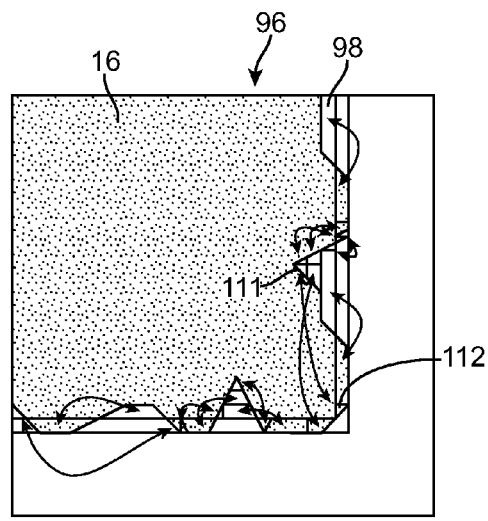
Figure 11D:
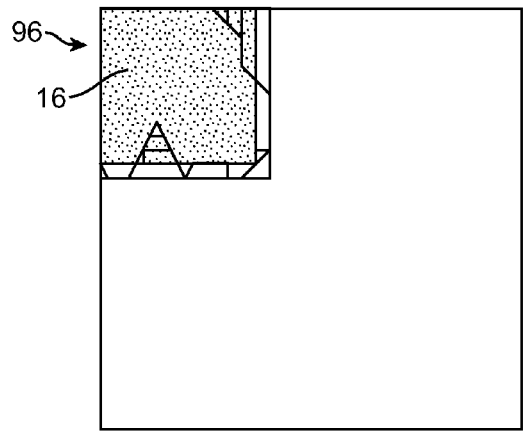
Figure 11C:
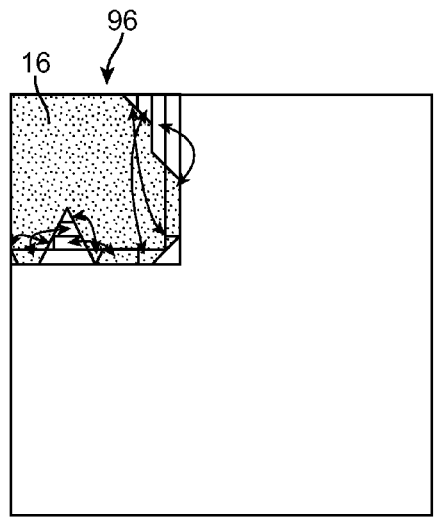

For example, a triangle shaped empty section 111 can be moved to corresponding section 112 within the rectangular area extending along the boundary lines 94 and 95, and the triangular section 112 is at a certain depth. This process can be repeated for other indentations of empty pixels 98 until the empty pixels 98 are distributed along an edge of the fiducial mark at the same depth. The result of this process is shown FIG. 11B. Empty spaces 98 in the other image shown in FIG. 11C can be reorganized in a similar manner, the result of which is shown in FIG. 11D. Thus, FIGS. 11A-D further illustrate that the area of the empty regions 98 within the bounding box 96 equals the average depth of the empty area 98 multiplied by the length of the edge (sum of "x" and "y" dimensions) of the box 96.

Embodiments of the invention advantageously utilize this proportional relationship of changes in the numbers of empty pixels 98 relative to the dimensions of a bounding box 96 defined by boundary lines 94 and 95 for a given pixel or point P to more effectively locate fiducial marks 16 in the presence of air bubbles 54 and other debris that overlaps the fiducial mark 16. Embodiments of the invention achieve these advantages by locating the fiducial mark 16 by selecting a point or pixel P on the specimen slide 14 that: 1. maintains an acceptable number of empty pixels 98 within the bounding box 96 defined by pixel P, e.g., below a threshold number that varies with the dimensions of the bounding box 96, and 2. maximizes the area or size of the bounding box 96 which, in turn, may also maximize the number of dark pixels 97 within the bounding box 96.

Figure 12:
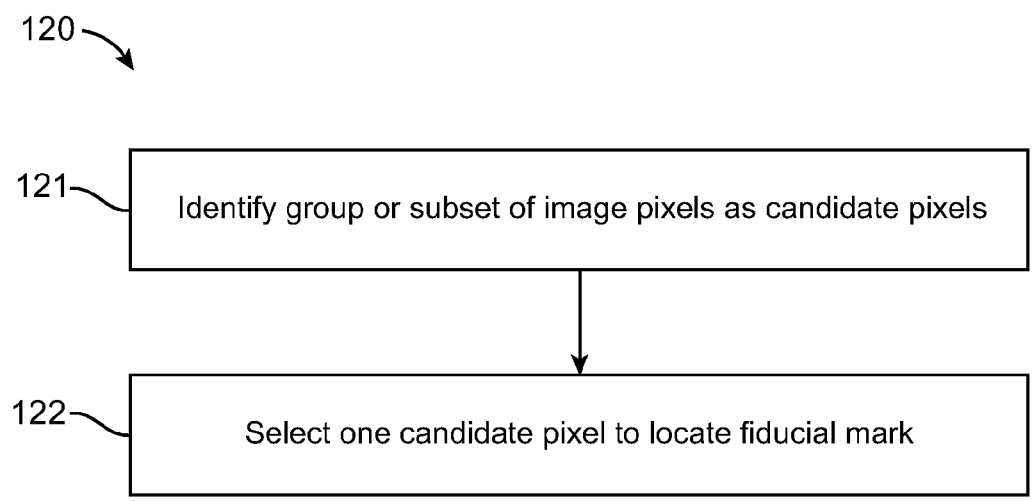
FIG. 12 is a flow chart of a method for locating a fiducial mark according to one embodiment.
Figure 13:
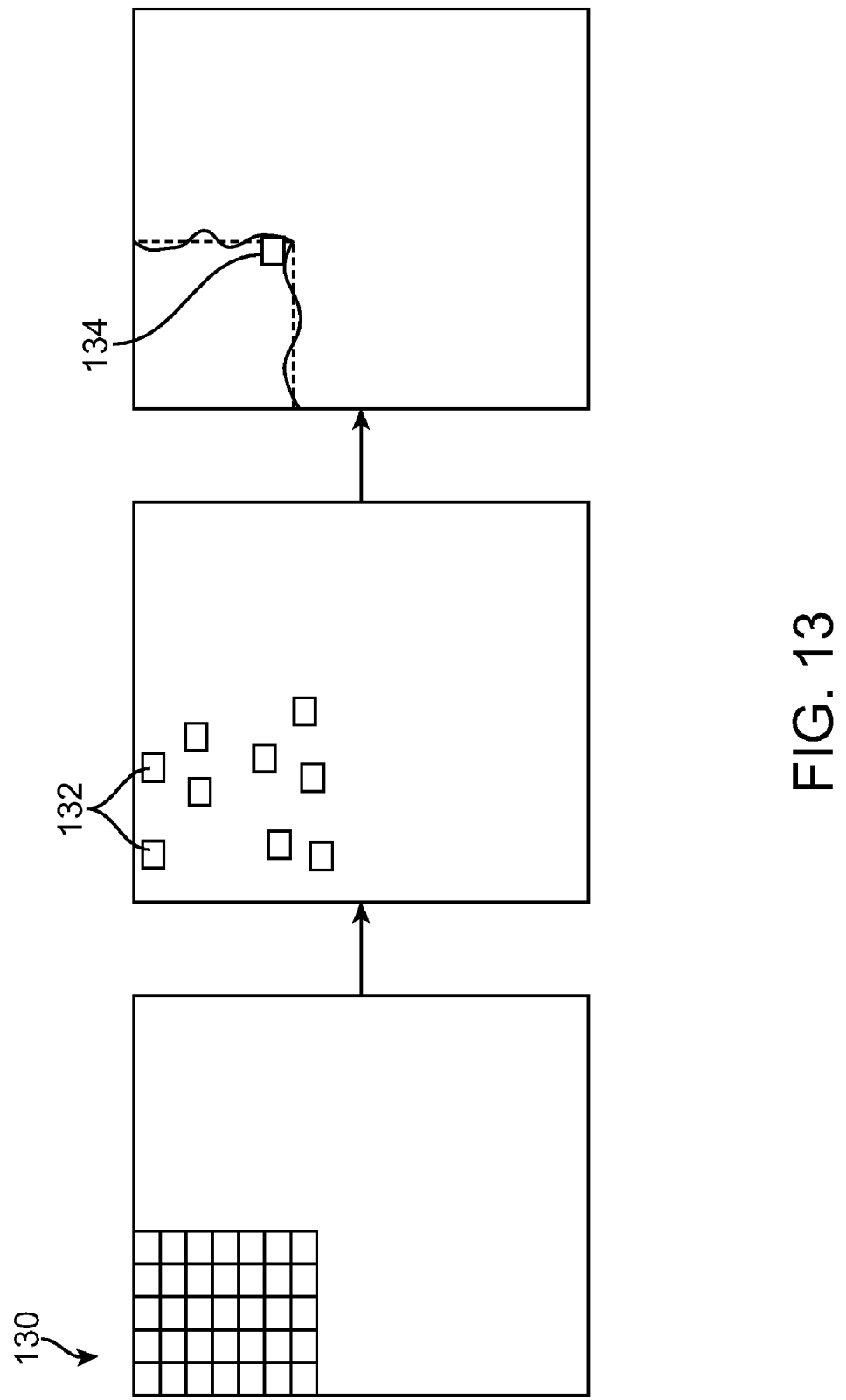
FIG. 13 illustrates a method for location a fiducial mark according to one embodiment.

More specifically, referring to FIGS. 12 and 13, according to one embodiment, a method 120 of locating a fiducial mark 16 includes identifying a group or subset of image pixels 130 as candidate pixels 132 in step 1205. A candidate pixel 132 is a pixel that defines an area or bounding box 96 (based on boundary lines 94 and 95 extending from the pixel) containing an acceptable number of empty pixels 98 for the dimensions of the bounding box 96. According to one embodiment, a candidate pixel 132 is a pixel that defines a bounding box 96 containing an acceptable number of empty pixels 98 as a proportion of or relative to the perimeter of the bounding box 96.

A candidate pixel 132 may or may not be a pixel that is ultimately used to locate a fiducial mark 16. Depending on the image, there may be one, a few or many candidate pixels 132. For example, an average image of about two million pixels may contain about five hundred thousand candidate pixels 132. Thus, FIG. 13 is provided for purposes of illustration to generally show that a subset of image pixels 130 is identified as candidate pixels 132. Additionally, persons skilled in the art will appreciate that whether a pixel is a candidate pixel 132 can vary depending on, for example, the brightness value or cutoff that is used to distinguish a fiducial mark or dark pixel 97 from an empty pixel 98.

Having identified a set or group of candidate pixels 132, in step 122, one candidate pixel 134 is selected to locate the corner of the fiducial mark 16. According to one embodiment, the selected candidate pixel 134 is the candidate pixel that defines largest bounding box 96, e.g., the bounding box 96 with the largest area or the largest perimeter.

In one embodiment of the invention, steps 121 and 122 can be performed such that all candidate pixels 132 are first identified, and then one candidate pixel 134 of all of the identified candidate pixels 132 is selected. In an alternative embodiment, the step 121 and 122 can be combined by generating the candidate pixels one by one and storing only the best candidate pixel 134 as the currently selected candidate pixel 134. The stored candidate pixel 134 may be replaced by a new candidate pixel if the new candidate pixel defines larger bounding box 96.

Figure 14:
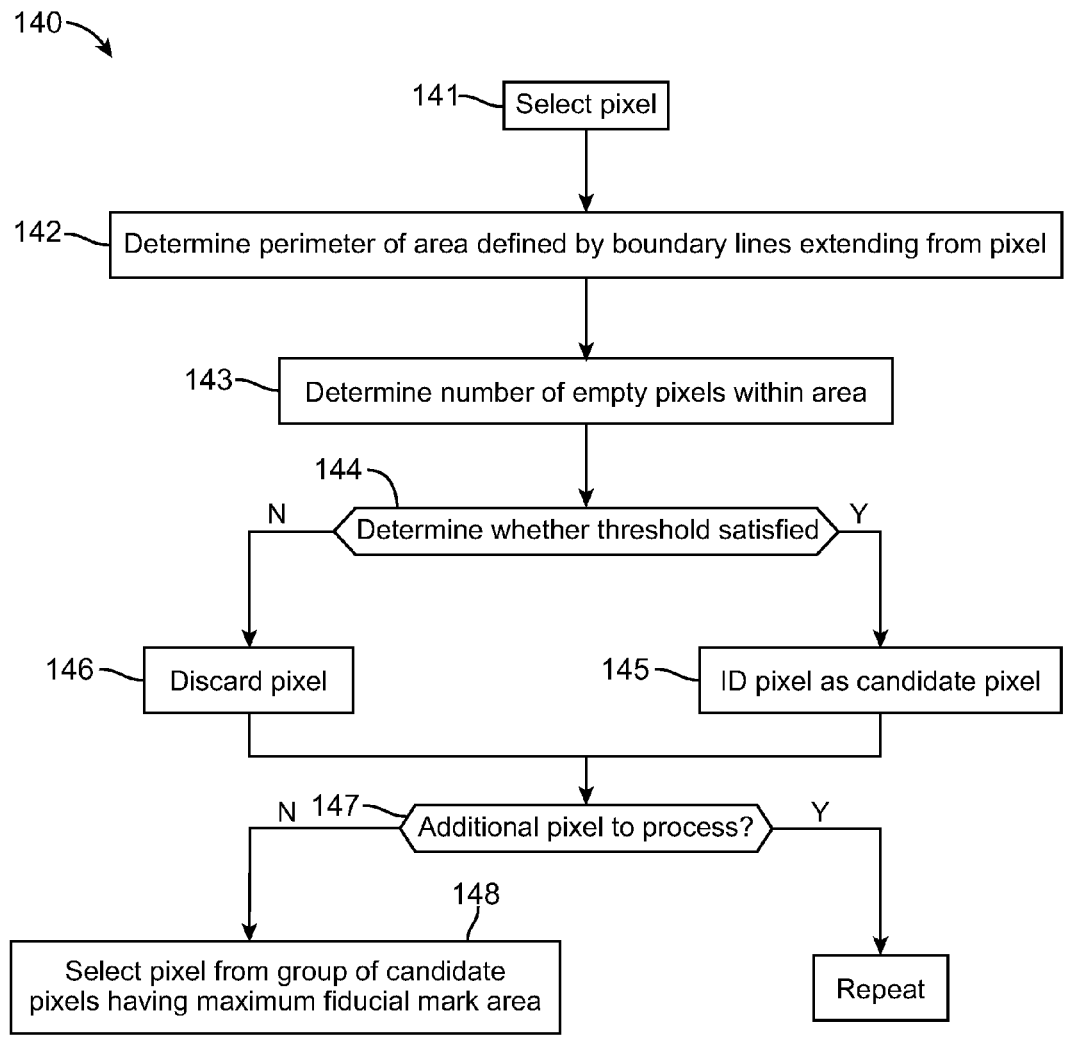
FIG. 14 is a flow chart of a method for locating a fiducial mark according to another embodiment.

Referring to FIG. 14, a method 140 according to one embodiment of the invention includes selecting a pixel of the image 130 in step 141. In step 142, dimensions of the area or boundary box 96 defined by boundary lines 94 and 95 extending from the selected pixel are determined. The dimension can be the perimeter of the bounding box or a portion of the perimeter. For example, referring again to FIG. 9, in the illustrated embodiment, one boundary line 94 is a horizontal line with a length "x" and the other boundary line 95 is a vertical boundary line with a length "y" so that the perimeter of the bounding box area is 2*(x+y). In step 143, the number or area of empty pixels 98 contained within the defined bounding box 96 is determined. Step 143 may involve, for example, counting the number of empty pixels 98 within the bounding box 96 and/or calculating an area of empty pixels 98.

In step 144, a determination is made whether a threshold number of empty pixels 98 or empty area is satisfied. According to one embodiment of the invention, step 144 involves calculating a ratio and comparing the ratio to a threshold. In one embodiment, the ratio is (number of empty pixels)/(perimeter of area), e.g., (number of empty pixels)/(2(x+y)). Thus, step 144 involves determining whether the ratio value is greater than or less than a certain threshold value. This is equivalent to determining whether (number of empty pixels)/(x+y) is greater than a threshold value that is twice as high. In step 145, if the threshold is satisfied, e.g., if the value of (number of empty pixels/(x+y) is less than a certain threshold value, then the pixel is selected or identified as a candidate pixel 132. If the threshold is not satisfied, then in step 146, the pixel is not selected as a candidate pixel 132 and is discarded.

In step 147, a determination is made whether additional pixels of the image 130 should be processed. If so, then steps 141-147 can be repeated for each additional pixel. If not, and all of the image pixels (or all of the necessary image pixels) have been processed, then in step 148, one candidate pixel 134 of the group or set of identified candidate pixels 132 is selected. The selected candidate pixel 134 is used to locate the corner of the fiducial mark 16. According to one embodiment, the selected candidate pixel 134 is the candidate pixel that defines a bounding box 96 having the largest area.

Thus, embodiments of the invention may utilize a ratio to identify candidate pixels 132 that define a constraint on the size of the bounding box 96 defined boundary lines 94 and 95 so that the number of empty pixels 98 contained within the bounding box 96 should be no greater than a multiple of the perimeter (or other dimension) of the bounding box 96. The point at the corner location that is selected should define the largest area of the bounding box subject to this "empty pixel" constraint. According to one embodiment, this can be done by selecting the (x, y) location that maximizes x*y (i.e., the size or area of the bounding rectangle 96) while, at the same time, the number of empty pixels 98 is less than a certain value d*(x+y), where d is the expected mean indentation depth.

Thus, a number of empty pixels 98 in a first bounding box is counted or calculated, a number of empty pixels 98 in a second bounding box is counted or calculated, and so on, for each pixel of the image so that a ratio of a number of empty pixels relative to a size or dimension of the bounding box can be calculated to determine whether a pixel is a candidate pixel 132. One manner of determining the number of empty pixels 98 is to manually count the number of empty pixels 98 within a bounding box 96 defined by boundary lines 94 and 95 extending up and to the left of given (x, y) point or pixel in the image. This can be done for each pixel independently, and will take an amount of time proportional to the square of the number of pixels. Alternatively, according to one embodiment of the invention, the number of empty pixels 98 within a box 96 defined by a certain point or pixel can be determined based on a previous count of empty pixels 98 within a different box 96 defined by a different point pixel; this makes the amount of time necessary to process a set of pixels proportional to the number of pixels instead of the number squared, resulting in more efficient analysis.

FIGS. 15-19 illustrate one embodiment of the invention, in which the number of empty pixels 98 for purposes of calculating the ratio (number of empty pixels)/(x+y), used to identify candidate pixels 132. FIGS. 15-19 show an example image comprising a grid of pixels. Pixels corresponding to the fiducial mark 16 paint are shaded. A light pixel 98 may be surrounded by dark pixels 97 when, for example, that particular light pixel 98 is not painted. In the illustrated grid, an x-y coordinate system is applied to the pixels so that (0, 0) is at the top left corner of the image 130.

Figure 15:
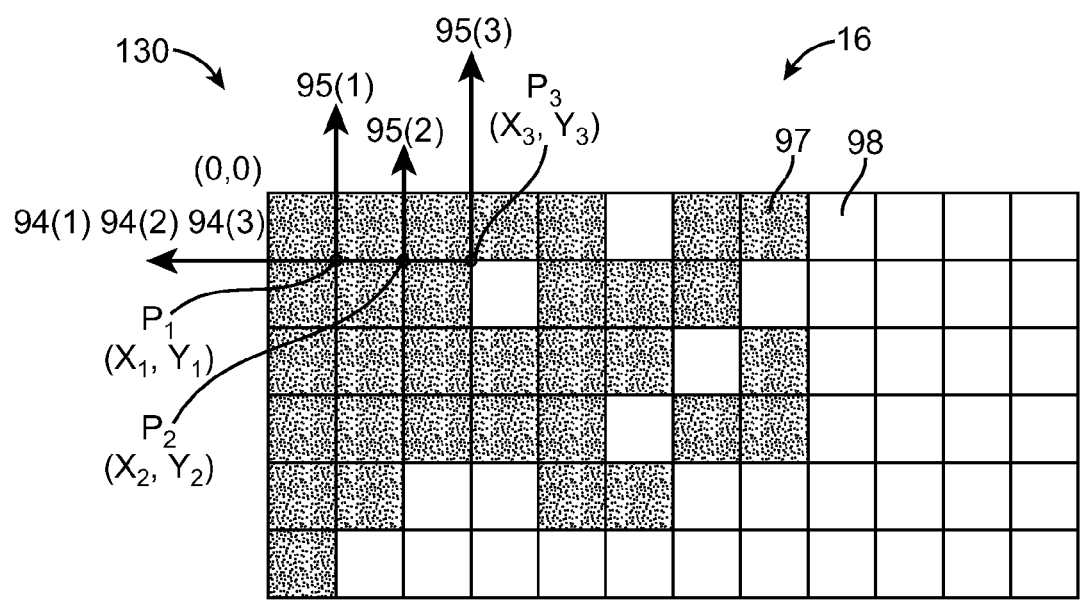
FIG. 15 generally illustrates a corner of a fiducial mark having a shaped edge with reference to an x–y coordinate system.

Referring to FIG. 15, a first point P1 at the lower right corner of a first dark pixel 97 is identified by (x1, y1). The bounding area 96 defined by horizontal and vertical boundary lines 94(1) and 95(1) extending upwardly and to the left from P1 includes one pixel, which is a dark pixel 97. There are no empty pixels 98 in the area 96 defined above and to the right of P1. Similarly, a second point P2 is identified by (x2, y2). The bounding area 96 defined by horizontal and vertical boundary lines 94(2) and 95(2) extending upwardly and to the left from P2 includes two pixels. One pixel is the dark pixel 97 that was previously discussed with reference to point P1. The other pixel is the "next" pixel that is introduced into the area 96 when the next point P2 is selected. The next pixel is also a dark pixel 97. Thus, there are no empty pixels 98 in the area 96 defined above and to the right of P2. Further, a third point P3 is identified by (x3, y3). The bounding area 96 defined by horizontal and vertical boundary lines 94(3) and 95(3) defined by P3 includes three pixels including the two pixels previously considered. The third pixel is the "next" pixel that is introduced into the area 96 when the next point P3 is selected. The third or next pixel is also a dark pixel 97. Thus, there are no empty pixels in the area 96 defined above and to the right of P3.

Figure 16:
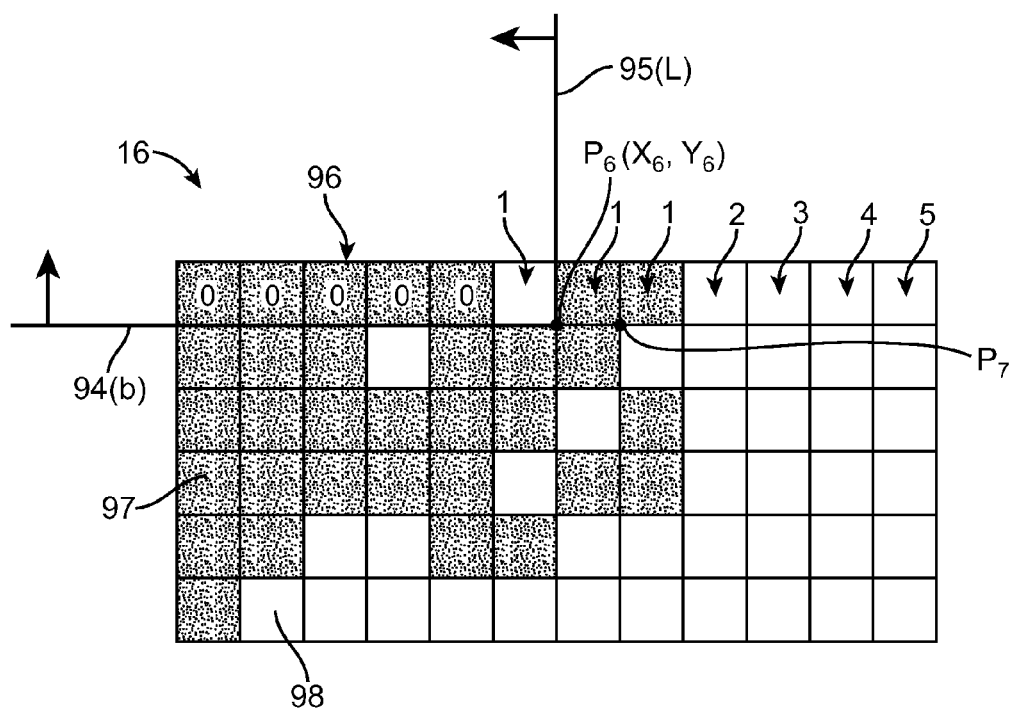
FIG. 16 illustrates a method of determining a number of empty pixels relative to a given pixel according to one embodiment.
Figure 17:
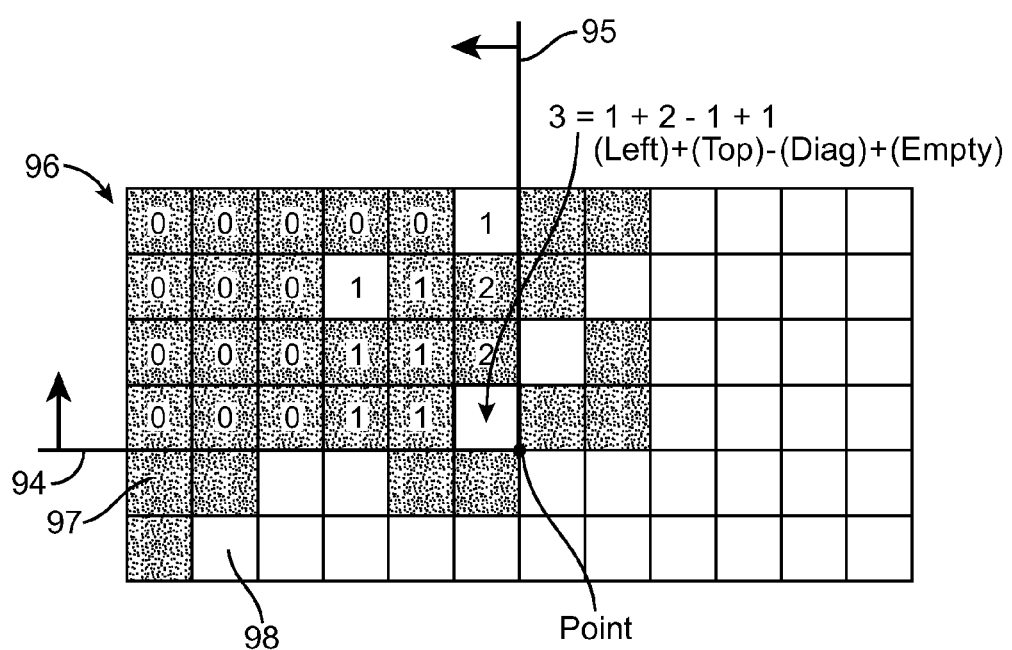
FIG. 17 further illustrates a method of determining a number of empty pixels relative to a given pixel according to one embodiment.
Figure 18:
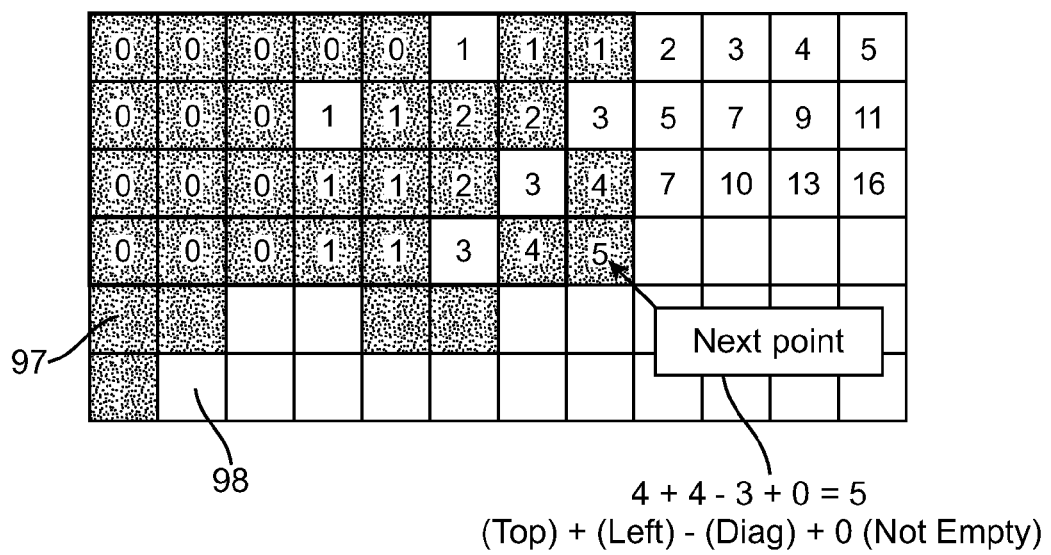
FIG. 18 further illustrates a method of determining a number of empty pixels relative to a given pixel according to one embodiment.

As shown in FIGS. 16-18, grid cells can be labeled with a number, which represents the number of empty pixels above and to the left of a particular point. While the empty pixel count could be calculated independently for each pixel, according to one embodiment, a method of counting the number of empty pixels is done using previous counts of empty pixels, which can be significantly faster than counting independently, particularly considering that an image can have, for example, two million pixels.

For example, referring to FIG. 16, a "0" value can be assigned to the first pixel to represent that there are no empty pixels 98 above and to the left of P1. Similarly, a "0" value can be assigned to the second pixel to represent that there are no empty pixels 98 above and to the right of P2, and a "0" can be assigned to the third pixel to represent that there are no empty pixels 98 above and to the right of P3. This process can continue for additional pixels in the row.

FIG. 16 illustrates a point P6 that defines an area 96 defined by boundary lines 94(6) and 95(6) extending from the point P6. The area 96 contains five dark pixels 97 (each of which is assigned a "0" value) and an additional or next pixel as a result of selection of the next point P6. This pixel, in contrast to previously discussed pixels, is an empty pixel 98. Thus, there is one empty pixel 98 above and to the left of point P6, and a value of "1" can be assigned to this pixel. Similarly for P7, the area defined by boundary lines extending from P7 encloses the six previously analyzed dark pixels (five of which were assigned a "0" value; one of which was assigned a "1" value) and a new or next pixel. In this case, the next pixel is a dark pixel 97. Thus, there are no new empty pixels 98 in the area 96 defined by boundary lines extending from point P7. As a result, a value of "1" can also be assigned to this seventh pixel since the empty pixel count remains the same. This process continues for each pixel of the image.

FIG. 17 further illustrates how numbers can be assigned to represent empty pixel count values. FIG. 17 only shows the pixel count values above and to the right of a point P for purposes of illustration and explanation. A shown in FIG. 17, boundary lines 95 and 95 extending to the left and upwardly from point P define an area 96 that includes 24 pixels. Three of these 24 pixels are empty pixels 98 and, therefore, the next pixel introduced by point P is assigned a value of "3" to indicate there are three empty pixels 98 in the area 96 defined by boundary lines 94 and 95 extending from point P.

Figure 19:
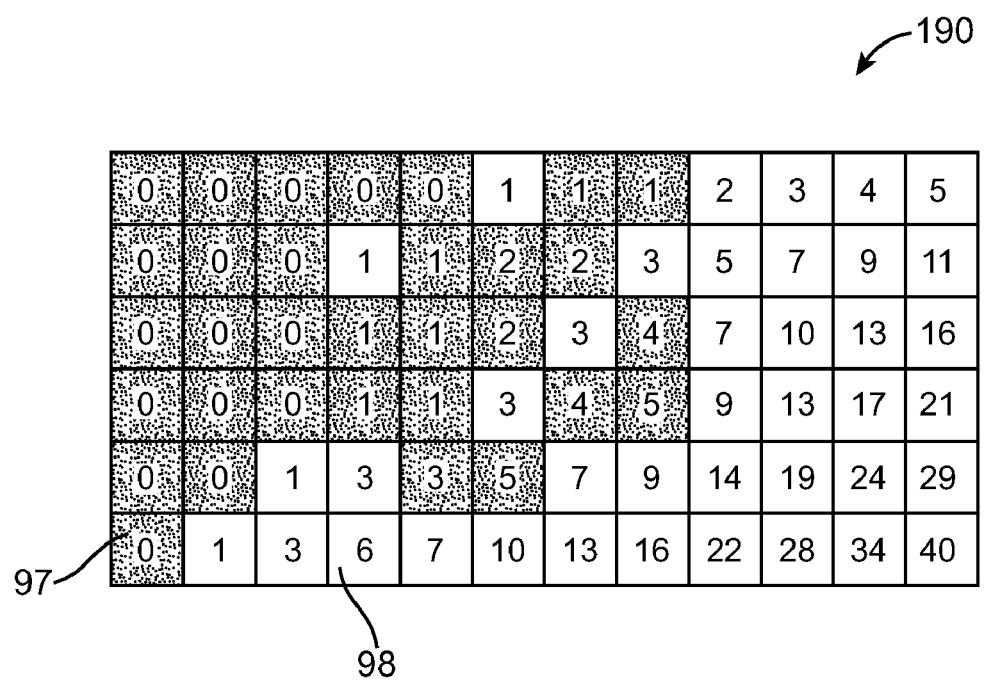

Similarly, referring to FIG. 18, consider the pixel indicated as "Next point" in FIG. 18. Every pixel above or to the left of "Next Point" is contained in the region defined either by the pixel immediately above "Next Point" or the pixel immediately to the left of "Next Point". If the empty counts for these two neighbor pixels are added together, all the pixels in the region defined by the pixel diagonally up and to the left of "Next Point" will be included twice in the sum. Therefore, the number of empty pixels above and to the left of "Next Point", not counting "Next Point", is equal to the count for the pixel above "Next Point", plus the count for the pixel to the left, minus the count for the diagonal pixel. If "Next Point" is empty, an additional value of one should be added to this sum. FIG. 19 further illustrates the "Next Point" analysis illustrated in FIG. 18.

In more mathematical terms, let $E(x, y)$ be the number of empty pixels above and to the left of the pixel at image coordinates $(x, y)$; that is, the number of empty pixels $(x', y')$ for which $x' \leq x$ and $y' \leq y$. Let $E(x, y)$ be zero if $(x, y)$ is not a point within the image. Then, for each $(x, y)$ in the image, $E(x, y)$ is equal to $E(x-1, y)+E(x, y-1)-E(x-1, y-1)$ plus one if the pixel at $(x, y)$ is itself empty.

According to one embodiment of the invention, a method locating a fiducial mark 16 by selecting a point or pixel that maximizes the area of dark or fiducial mark 97 while maintaining the number of empty or light pixels 98 (determined, e.g., by the method described above) below a certain number can be expressed as:

```
let
    I(x, y) = grayscale value of pixel at coordinates (x, y) in image,
    T = threshold grayscale value below which pixel is considered
        part of mark,
    E(x, y) = count of pixels (x', y') for which x' <= x, y' <= y,
        and I(x', y') >= T.
    M = constant multiplier,
then fiducial mark corner is at the coordinates (x1, y1) that maximize
x1*y1,
    subject to the constraint that
    E(x1, y1) ≤ M * (x1 + y1) or equivalently,
    E(x1, y1) / (x1 + y1) ≤ M.
``` wherein E (x,y) is calculated as follows:

```
let
    B(x, y) = 1 if I(x, y) >= T, 0 otherwise,
    E(x, y) = 0 when x < 0 or y < 0
When x >= 0 and y >= 0,
    then E(x, y) = E(x – 1, y) + E(x, y – 1) – E(x – 1, y – 1) + B(x, y).
```

Thus, if E values in the image are calculated row by row (y=0 to y=image height), then by moving from left to right (x=0 to x=image width) within each row, each value representing the number of empty pixels 98 can be based on previously computed values, thereby reducing the computational complexity from $O(n^2)$ in the number of pixels to $O(n)$.

This is expressed in other terms by the following pseudo code:

```
bestX = 0;
bestY = 0;
for y = 0 to (image height – 1)
    for x = 0 to (image width – 1)
        E(x, y) = E(x–1, y) + E(x, y–1) – E(x–1, y–1) + B(x, y);
        if E(x, y) ≤ M * (x + y) and x * y > bestX * bestY
            bestX = x;
            bestY = y;
        end if
    end for
end for
return (bestX, bestY);
```

With the above-described methods, various embodiments of the invention can be used to quickly determine the number of empty pixels 98 contained within an area or bounding box 96, thereby allowing the ratio of (number of empty pixels)/(x+y) to be calculated to determine whether a particular pixel is a candidate pixel 132. Persons skilled in the art will appreciate that although FIGS. 15-19 illustrate one method of determining the number of empty pixels 98 within a given bounding box or area 96, other processing methods and techniques can also be used for this purpose. Accordingly, the example of determining empty pixel counts with a type of dynamic programming is provided for purposes of illustration and explanation, and other suitable methods can also be used to count the empty number of pixels within a given area or bounding box 96.

Having located the fiducial mark 16, embodiments also improve the manner in which the imaging station 18 focuses on the located fiducial mark 16 may be improved. In a well focused image of a fiducial mark 16, the edge 92 of the mark 16 is an abrupt transition from dark to light. If the image is poorly focused, however, the transition is more of a blurred gradual gradient. The width of this blurred gradient region depends on the distance from the ideal focal plane and can, therefore, be used as a focus score for automatic focusing processes.

According to one embodiment, the width of the blurred region can be determined by using embodiments for locating a fiducial mark (e.g., the method shown in FIG. 14) and adjusting the intensity threshold between the "mark" and "empty" pixels. More particularly, according to one embodiment, focus improvements are achieved by performing, e.g., the method 140 shown in FIG. 14, using two different brightness or threshold levels that denote whether a pixel is an empty pixel 98 or a fiducial mark pixel 97. For example, the method 140 can be performed based on a brightness or threshold value of 192 so that pixels having gray values less than or equal to 192 are considered fiducial mark pixels 97, and pixels having gray values above 192 are empty pixels 98, and also at another brightness or threshold level, e.g., 64, so that pixels having gray values less than or equal to 64 are considered fiducial mark pixels 97, and pixels having gray values above 64 are empty pixels 98. Persons skilled in the art will appreciate that other brightness threshold values can be utilized.

Use of different brightness or threshold values results in an automatic focusing system or process selecting different candidate pixels which, in turn results in different bounding boxes that are separated by a distance "d". This distance can be used to indicate the focus quality and allow the image with the best focus to be selected. The presence of dust on top of the cover slip does not affect the measurement of blur, even though dust or other debris may be very sharply focused.

Figure 20:
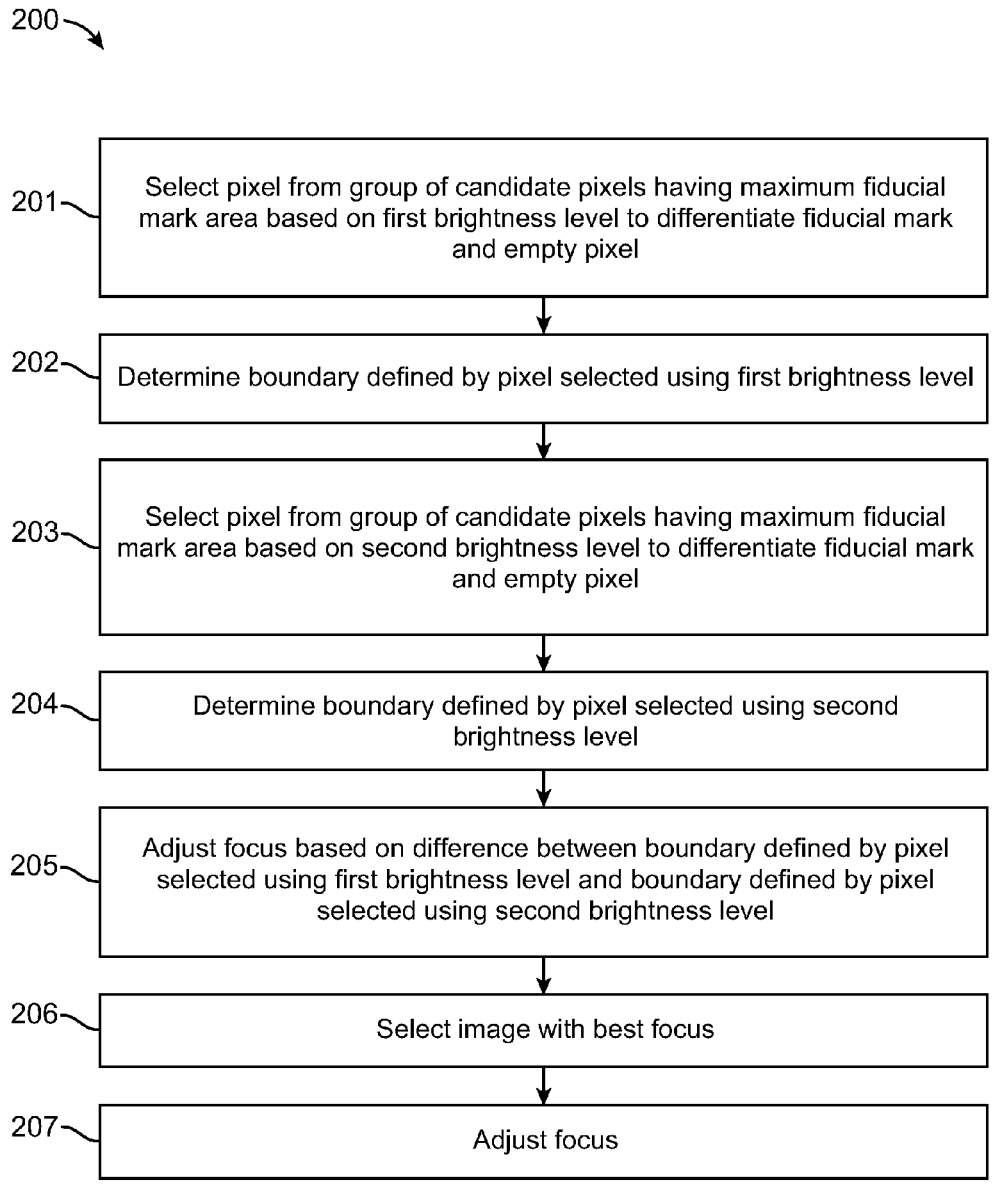
FIG. 20 is a flow chart of a method of calculating a focus score for an image of a fiducial mark according to one embodiment.

Thus, referring to FIG. 20, one embodiment of a method for focusing on a fiducial mark includes selecting a candidate pixel from a group or set of candidate pixels 132 having maximum fiducial mark area during processing at a first empty pixel brightness or threshold level in step 201. In step 202, a boundary box or area 96 defined by the selected candidate pixel is determined based on the first threshold level. In step 203, a candidate pixel is selected from a group or set of candidate pixels 132 having maximum fiducial mark area during processing at a second empty pixel brightness or threshold level. In step 204, a boundary box or area defined by the selected candidate pixel is determined based on the second empty pixel threshold level. Then, in step 205, the degree to which a fiducial mark 16 is out of focus is determined based on the distance between the two boundary boxes. In step 206, the image with the best focus can be selected. If necessary, in step 207, the imaging microscope 26 can be adjusted to further improve the focus on the fiducial mark 16.

FIGS. 21-23 illustrate one example of how embodiments of the invention can be implemented to improve focus quality. In the illustrated embodiment, empty pixel threshold gray values of 64 and 192 were utilized, but persons skilled in the art will appreciate that other values can also be utilized. Referring to FIG. 21, an inner bounding box 210 is defined by boundary lines extending from a candidate pixel selected using a higher empty pixel threshold so that fewer pixels are selected as "dark" pixels 97. An outer bounding 212 is defined by boundary lines extending from a different candidate pixel selected using a lower empty threshold so that more pixels are selected as "dark" pixels 97. In the illustrated example, the inner and outer boxes 210 and 212 are separated by a small distance "d". Thus, in this example, the different empty pixel threshold values of 64 and 192 do not significantly alter the resulting location of a fiducial mark 16. However, as the fiducial mark 16 goes farther out of focus, the distance "d" between the two bounding boxes increases.

Referring to FIG. 22, the fiducial mark 16 is more out of focus compared to FIG. 21. The inner boundary box 220 corresponds to a fiducial mark 16 that is located when a higher empty pixel threshold is used so that fewer pixels are selected as "dark" pixels 97. The outer boundary box 222 corresponds to a fiducial mark 16 that is located when a lower empty pixel threshold is used so that more pixels are selected as "dark" pixels 97. Comparing FIGS. 21 and 22, the distance "d" between the boxes 220 and 222 is larger than the distance "d" between boxes 210 and 212 as a result of reduced quality of focus on the fiducial mark 16.

Similarly, referring to FIG. 23, the fiducial mark 16 is even more out of focus, and the dust 52 below the fiducial mark 16 is more in focus compared to FIGS. 21 and 22. The inner boundary 230 corresponds to a fiducial mark 16 that is located when a higher empty pixel threshold is used so that fewer pixels are selected as "dark" pixels 97. The outer boundary box 232 corresponds to a fiducial mark 16 that is located when a lower empty pixel threshold is used so that more pixels are selected as "dark" pixels 97. Comparing FIG. 23 to FIGS. 21 and 22, the distance "d" between the boxes 230 and 232 becomes increasingly larger as the fiducial mark 16 is increasingly out of focus. However, the dust 52 near the bottom of the fiducial mark 16 does not affect the focus measurement even with the larger in-focus dust particles shown in FIG. 23 since embodiments advantageously ignore all objects except the fiducial mark 16 corner.

Figure 1:
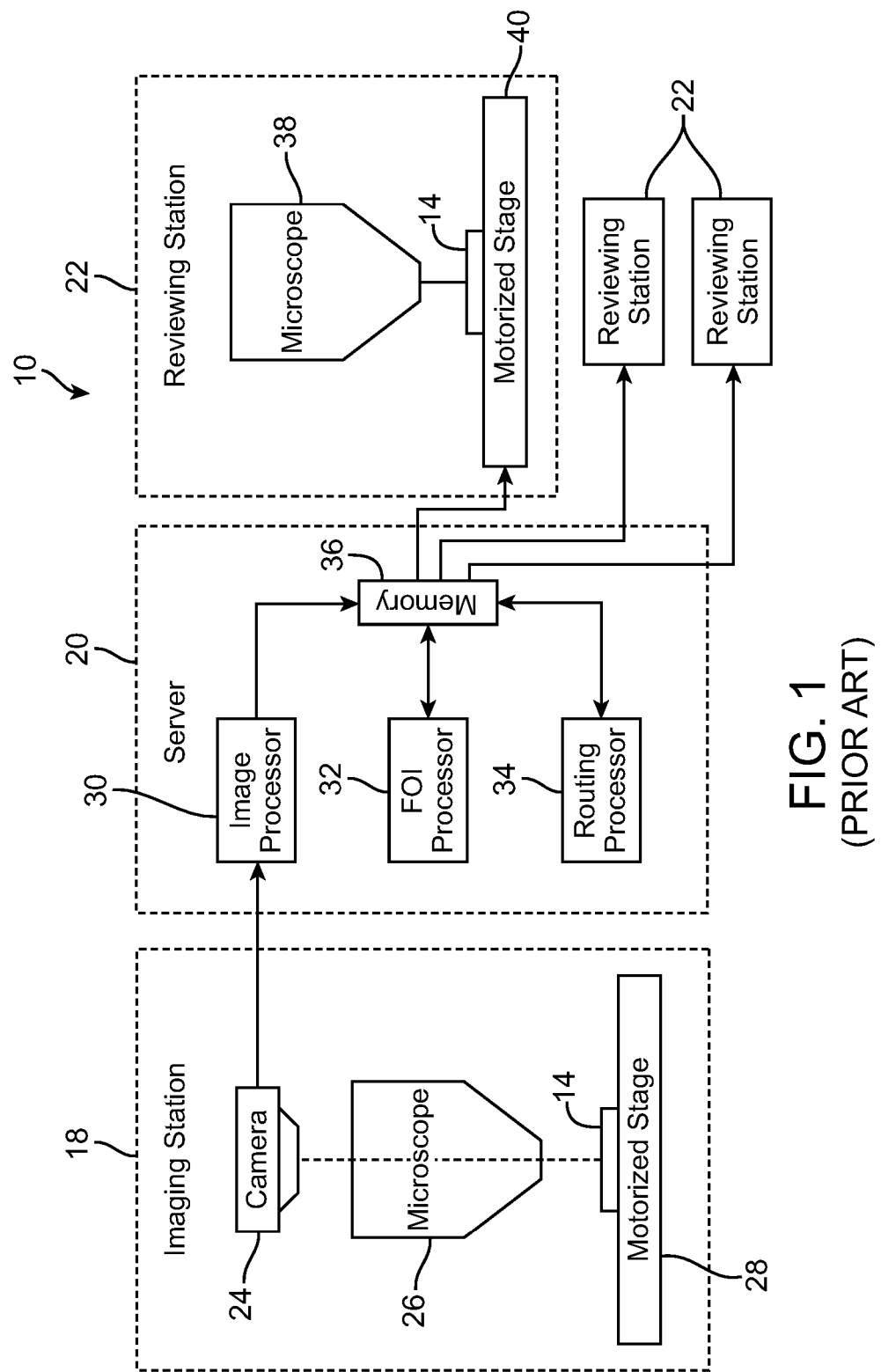
FIG. 1 illustrates a known biological screening system including an imaging station and a reviewing station.
Figure 2:
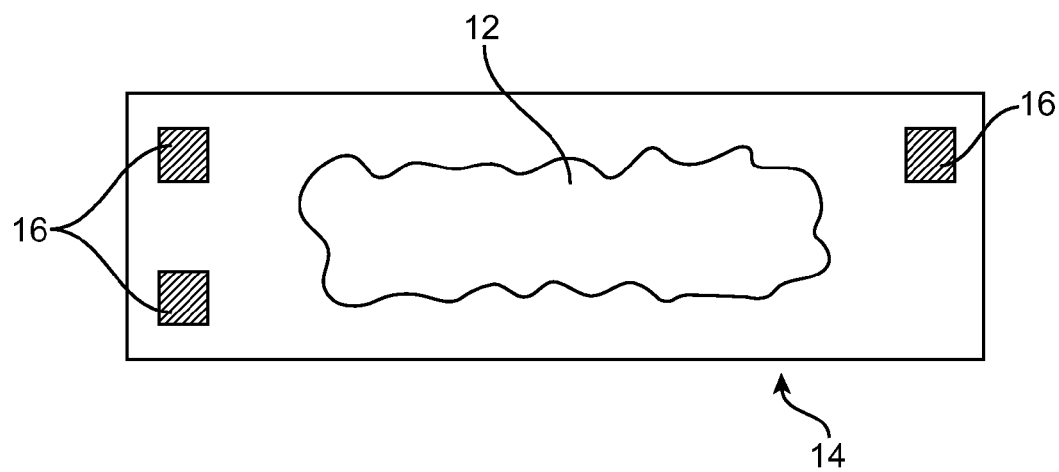
FIG. 2 illustrates a known microscope slide carrying a biological specimen and having fiducial marks.
Figure 3:
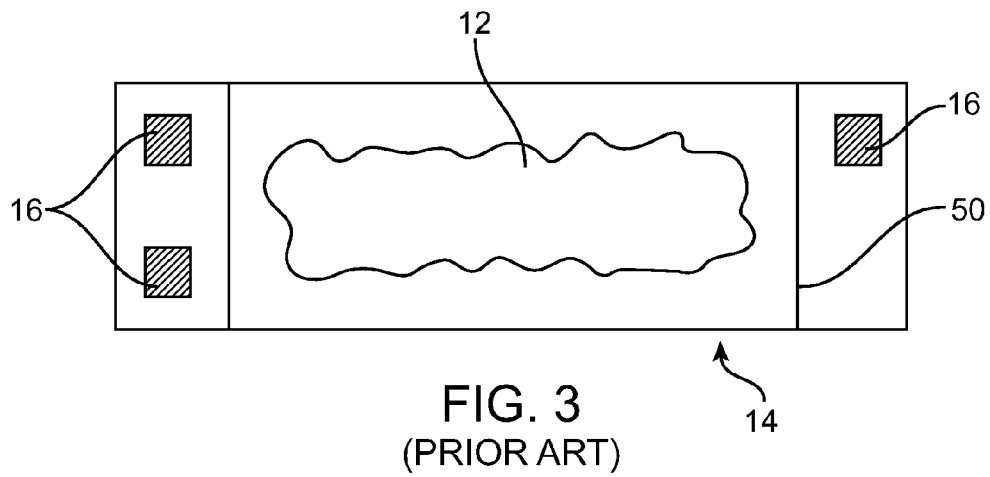
FIG. 3 illustrates a known microscope slide carrying a biological specimen and having fiducial marks and a cover slip.
Figure 4:
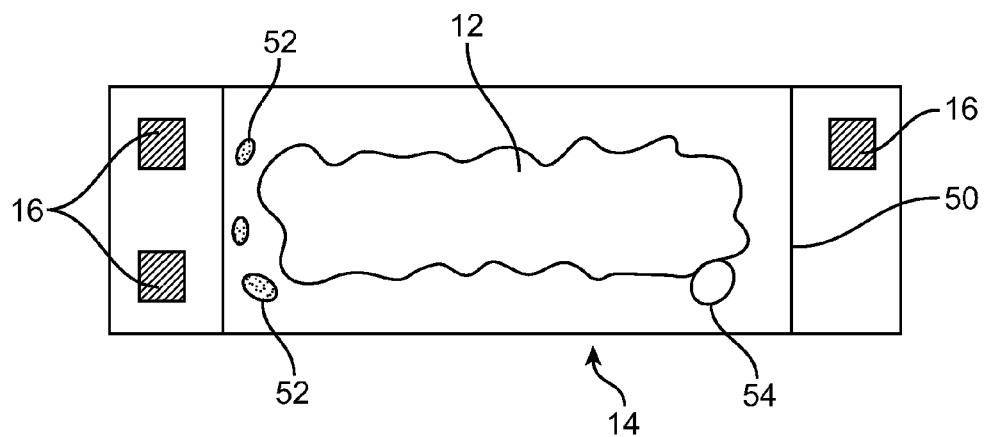
FIG. 4 illustrates a known microscope slide having dust or debris on top of a cover slip.
Figure 5:
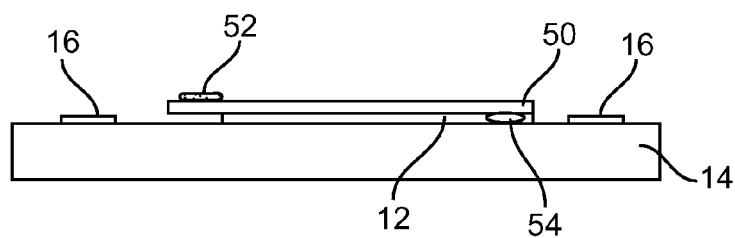
FIG. 5 is a side view of FIG. 4 generally illustrating dust and an air bubble on a specimen slide.
Figure 6:
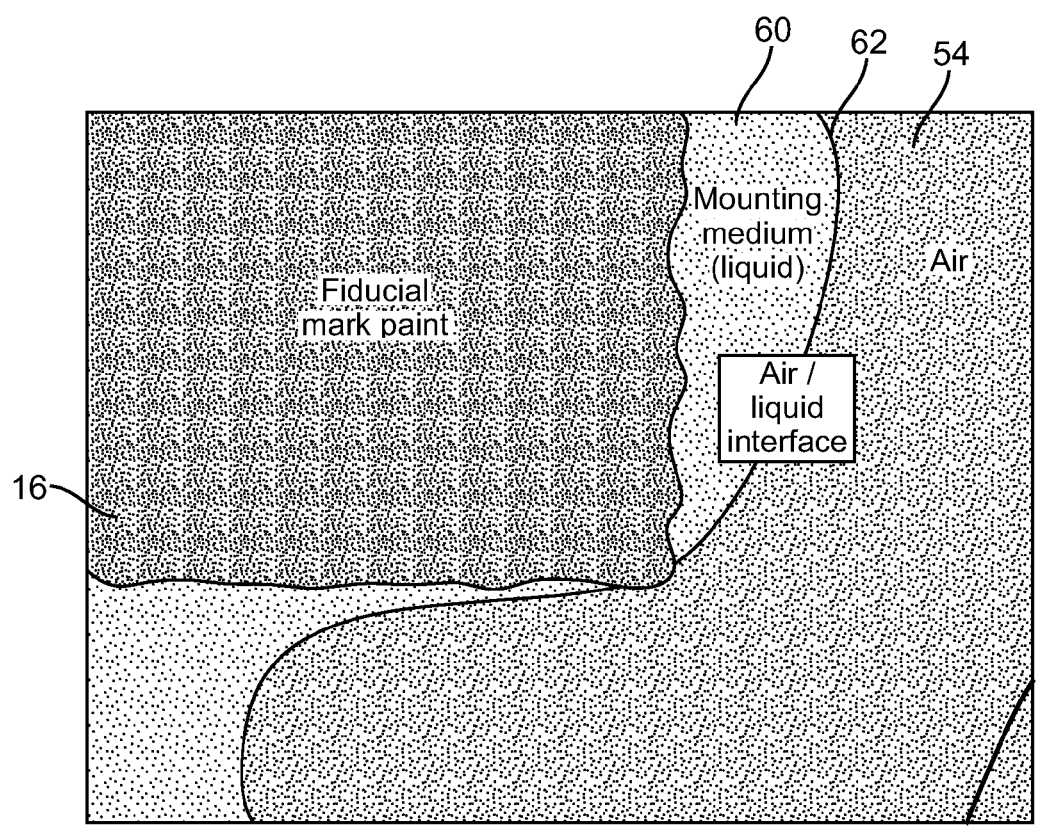
FIG. 6 further illustrates an air bubble adjacent to a portion of a fiducial mark.
Figure 7:
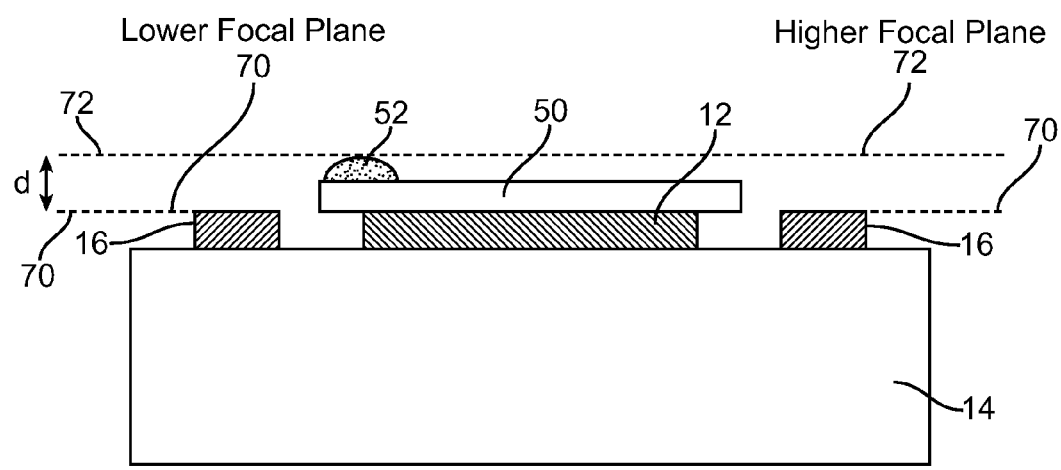
FIG. 7 illustrates different focal planes that are generated as a result of dust or debris as shown in FIG. 5.
Figure 8:
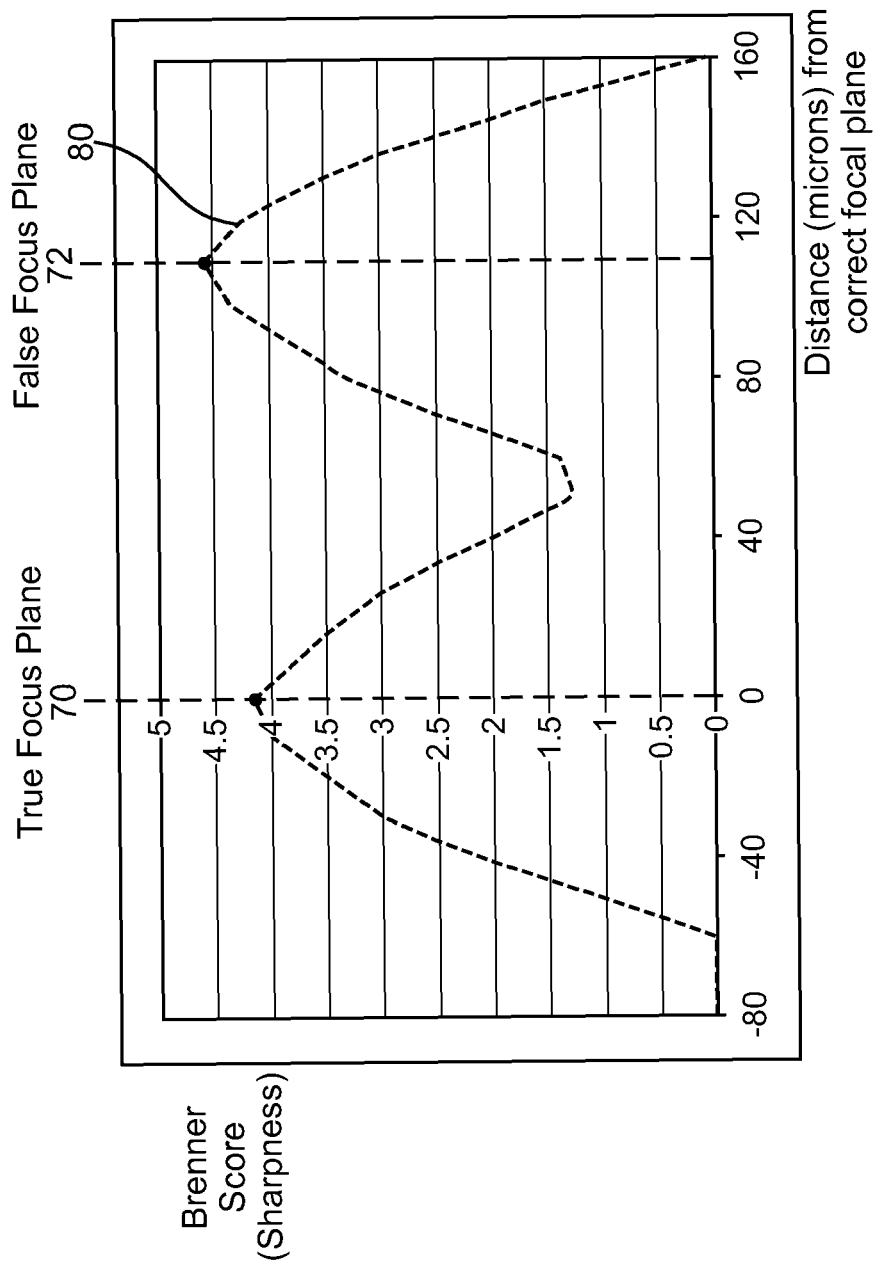
FIG. 8 is a chart graphically illustrating a false second peak generated by dust or debris.
Figure 24:
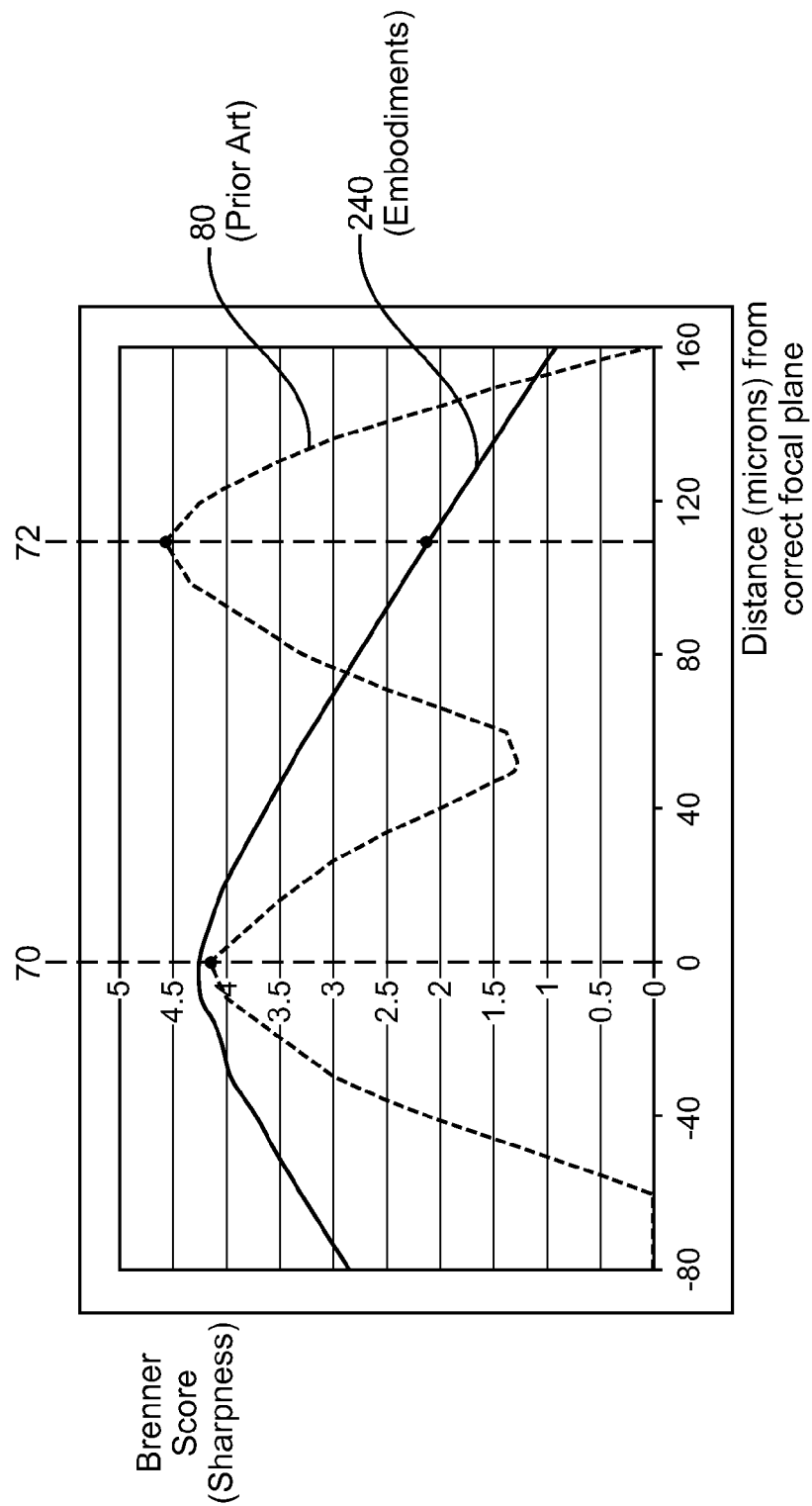
FIG. 24 is a chart graphically illustrating how embodiments eliminate a false second peak corresponding to dust or debris.

These advantages are further illustrated in FIG. 24, which is a chart illustrating how embodiments improve the process of focusing on a fiducial mark. In FIG. 24, the dotted line 80 contains a false peak (FIG. 8) that is produced as a result of focusing on dust 52 rather than a fiducial mark 16 when using known systems. Embodiments of the invention advantageously eliminate the false peak 80 as demonstrated by the solid line 240, which represents the improved focus score achieved using one embodiment. The solid line 240 has a peak at 0 microns, i.e., at the correct focal plane 70, without a false peak 72, as in FIG. 7, which illustrates focusing known systems.

In another embodiment of the invention, the scale of blurring of the fiducial mark 16 can be calculated by comparing mark 16 locations or boundaries that are measured at different light/dark thresholds. For example, referring to the chart shown in FIG. 24, the solid line 240 is the Euclidean distance between the locations measured at thresholds of 64 and 192, inverted and scaled to align with the Brenner function. Using this distance for the fiducial mark 16 score, the imager microscope 26 and the review microscope 38 would focus on the true fiducial mark 16 focus plane rather than the higher, false focus plane 72 caused by dust and debris 52.

Although particular embodiments have been shown and described, it should be understood that the above discussion is not intended to limit the scope of these embodiments. Various changes and modifications may be made without departing from the scope of embodiments. For example, candidate pixels could be chosen based on some other function of the empty pixel count. The best candidate pixel could be chosen by maximizing the perimeter or the number of dark pixels contained instead of by maximizing area. Additionally, although the specification has described embodiments with reference to fiducial marks, persons skilled in the art will appreciate that embodiments can also be used to locate and focus on other specimen slide marks. Further, although embodiments have been described with reference to rectangle and box shapes, persons skilled in the art will appreciate that embodiments can be implemented with other shapes if desired.

As a further example, embodiments can be applied where there is a dark object in a known location on a slide. The degree of blur of that object could be found by measuring its size (when thresholded at two different levels as discussed above) to provide a focus score that is not influenced by dust on the slide. Thus, embodiments are intended to cover alternatives, modifications, and equivalents that may fall within the scope of the claims.

What is claimed is:

1. A method of locating a corner of a fiducial mark within an image of a specimen slide, the image having a plurality of pixels, the method comprising:
   selecting a pixel of the plurality of image pixels, the selected pixel defining an area based on lines extending from the selected pixel, the selected pixel being selected based on a ratio of a number of empty pixels in the defined area and one or more dimensions of the defined area satisfying a threshold; and
   determining a location of the corner of the fiducial mark using the selected pixel.

2. The method of claim 1, wherein the selected pixel defines the largest area compared to other image pixels that satisfy the threshold.

3. The method of claim 1, wherein the boundary lines are straight.

4. The method of claim 1, wherein the boundary lines extend from the selected pixel to an edge of the image.

5. The method of claim 1, wherein an area defined by each pixel is a square or a rectangle.

6. The method of claim 1, wherein the ratio is a ratio of (number of empty pixels in the area defined by the selected pixel) to (one or more dimensions of the area defined by the selected pixel).

7. A method of locating a corner of a fiducial mark within an image of a specimen slide, the image having a plurality of pixels, the method comprising:
   identifying a plurality of pixels as candidate pixels, each candidate pixel being identified based on a number of empty pixels in a bounding area defined by lines extending from the candidate pixel relative to one or more dimensions of the defined area;
   selecting one candidate pixel, wherein lines extending from the selected pixel define the largest bounding area compared to lines extending from other candidate pixels; and
   determining a location of the corner of the fiducial mark based on the selected candidate pixel.

8. The method of claim 7, wherein the bounding area corresponding to the selected pixel contains the largest number of dark pixels compared to bounding areas defined by other candidate pixels.

9. The method of claim 7, wherein the lines are straight.

10. The method of claim 7, wherein the lines extend from the selected candidate pixel to an edge of the image.

11. The method of claim 7, wherein the bounding area defined by each candidate pixel is a box or a rectangle.

12. The method of claim 7, wherein each candidate pixel is identified based on a ratio satisfying a threshold, the ratio comprising a ratio of a number of empty pixels in the bounding area defined by lines extending from the selected candidate pixel to one or more dimensions of the bounding area.

13. The method of claim 12, wherein each candidate pixel is selected based on a ratio of the number of empty pixels in the bounding area to one or more dimensions of the bounding area being below a threshold.

14. The method of claim 13, wherein the ratio is a ratio of the number of empty pixels in the bounding area to the perimeter of the bounding area.

15. The method of claim 14, wherein the ratio is a ratio of the number of empty pixels in the bounding area to the semi-perimeter of the bounding area.

16. The method of claim 7 performed in the presence of an air bubble or debris overlapping the fiducial mark.

17. The method of claim 7, wherein a pixel is treated as an empty pixel if a gray value of the pixel is greater than 128.

18. The method of claim 7 performed at multiple gray value thresholds.

19. The method of claim 18, further comprising
calculating a focus score based on a difference between a first bounding area and a second bounding area.

20. The method of claim 19, wherein the difference is the Euclidean distance between corners of the first and second bounding areas.

21. The method of claim 7 performed at multiple gray value thresholds, wherein
a first bounding area is identified using a first empty pixel threshold to identify a first location of the corner of the fiducial mark, and
a second bounding area is identified using a second empty pixel threshold to identify a second location of the corner of the fiducial mark.

22. The method of claim 21, further comprising
calculating a focus score based on a distance between the first and second bounding areas.

23. The method of claim 22, further comprising automatically focusing an image device based on the calculated focus score.

24. The method of claim 22, wherein the distance is the Euclidean distance between the corners of the first and second bounding areas.

* * * * *